United States Patent
Chen et al.

(10) Patent No.: US 12,346,499 B2
(45) Date of Patent: Jul. 1, 2025

(54) THREE-DIMENSIONAL DISPLAY SYSTEM, DRIVING CIRCUIT, AND DISPLAY METHOD

(71) Applicant: HIMAX TECHNOLOGIES LIMITED, Tainan (TW)

(72) Inventors: Pen-Hsin Chen, Tainan (TW); Ching-Wen Wang, Tainan (TW); Cheng-Che Tsai, Tainan (TW); Seng-Yu Huang, Tainan (TW); Yi-Hsiu Lin, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 0 days.

(21) Appl. No.: 18/817,228

(22) Filed: Aug. 28, 2024

(65) Prior Publication Data
US 2025/0181153 A1    Jun. 5, 2025

Related U.S. Application Data

(60) Provisional application No. 63/604,192, filed on Nov. 30, 2023.

(51) Int. Cl.
*G06F 3/01* (2006.01)
*G09G 3/00* (2006.01)
*G09G 3/20* (2006.01)
*G09G 5/00* (2006.01)

(52) U.S. Cl.
CPC ............ *G06F 3/013* (2013.01); *G09G 3/003* (2013.01); *G09G 3/2092* (2013.01); *G09G 5/006* (2013.01); *G09G 2310/08* (2013.01); *G09G 2354/00* (2013.01)

(58) Field of Classification Search
CPC ............ G06F 3/013; G09G 3/002–003; G09G 3/2092; G09G 3/2096; G09G 2354/00
See application file for complete search history.

(56) References Cited

U.S. PATENT DOCUMENTS

| | | | | |
|---|---|---|---|---|
| 9,332,222 | B2* | 5/2016 | Smith | H04N 13/254 |
| 10,078,367 | B2* | 9/2018 | Michail | G06T 7/536 |
| 11,202,052 | B2* | 12/2021 | Kerbiriou | H04N 13/128 |
| 2013/0176301 | A1* | 7/2013 | Yeon | G09G 5/00 345/419 |
| 2023/0007226 | A1* | 1/2023 | Diao | H04N 13/15 |
| 2023/0007228 | A1* | 1/2023 | Diao | H04N 13/366 |

FOREIGN PATENT DOCUMENTS

WO  WO-2017079329 A1 * 5/2017 ............. G01B 11/14

* cited by examiner

*Primary Examiner* — Patrick F Marinelli
(74) *Attorney, Agent, or Firm* — JCIPRNET

(57) ABSTRACT

A three-dimensional display system, a driving circuit, and a display method are provided. The three-dimensional display system includes an eye tracking module, a driving circuit, and a host device. The eye tracking module is configured to generate eye tracking data including a scene image and a scene depth map, and perform eye detection to output an eye position data and an eye depth data. The driving circuit is coupled to the eye tracking module, and configured to receive the eye position data and the eye depth data. The host device is coupled to the driving circuit, and configured to provide original three-dimensional image data. The driving circuit is further configured to dynamically adjust the original three-dimensional image data to generate an adjusted three-dimensional image data according to the eye position data and the eye depth data.

20 Claims, 6 Drawing Sheets

THREE-DIMENSIONAL DISPLAY SYSTEM, DRIVING CIRCUIT, AND DISPLAY METHOD

CROSS-REFERENCE TO RELATED APPLICATION

This application claims the priority benefit of U.S. provisional application Ser. No. 63/604,192, filed on Nov. 30, 2023. The entirety of the above-mentioned patent application is hereby incorporated by reference herein and made a part of this specification.

BACKGROUND

Technical Field

The disclosure relates a display technology; particularly, the disclosure relates to a three-dimensional display system, a driving circuit, and a display method.

Description of Related Art

The traditional naked-eye display system may obtain eye position data and eye depth data through the sensor and provides it to a host device of an image source to adjust the three-dimensional image through the host device of the image source. Therefore, a large transmission latency (approximately 200 milliseconds (ms)) may occur (i.e. due to the processing time of the host device is slower than the frame rate) when the host device of the image source of the traditional naked-eye display system provides the adjusted three-dimensional image data to the naked-eye three-dimensional display to display the adjusted three-dimensional image.

SUMMARY

A three-dimensional display system of the disclosure includes an eye tracking module, a driving circuit, and a host device. The eye tracking module is configured to generate eye tracking data including a scene image and a scene depth map, and perform eye detection to output an eye position data and an eye depth data. The driving circuit is coupled to the eye tracking module, and configured to receive the eye position data and the eye depth data. The host device is coupled to the driving circuit, and configured to provide original three-dimensional image data. The driving circuit is further configured to dynamically adjust the original three-dimensional image data to generate an adjusted three-dimensional image data according to the eye position data and the eye depth data.

A driving circuit for driving a three-dimensional display panel of the disclosure includes a micro-controller unit and a three-dimensional mapping circuit. The micro-controller unit is configured to receive original three-dimensional image data, eye position data and eye depth data. The three-dimensional mapping circuit is coupled to the micro-controller unit, and configured to dynamically adjust original three-dimensional image data to generate adjusted three-dimensional image data according to the eye position data and the eye depth data. The three-dimensional display panel is further configured to display an adjusted three-dimensional image according to the adjusted three-dimensional image data.

A display method of the disclosure includes the following steps: generating eye tracking data including a scene image and a scene depth map by an eye tracking module; performing eye detection to output an eye position data and an eye depth data by the eye tracking module; receiving the eye position data and the eye depth data by a driving circuit; providing original three-dimensional image data by a host device; and dynamically adjusting the original three-dimensional image data to generate an adjusted three-dimensional image data according to the eye position data and the eye depth data by the driving circuit.

Based on the above, according to the three-dimensional display system, the driving circuit, and the display method of the disclosure, the electronic device can effectively dynamically adjust a three-dimensional image based on the eye position of the user.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
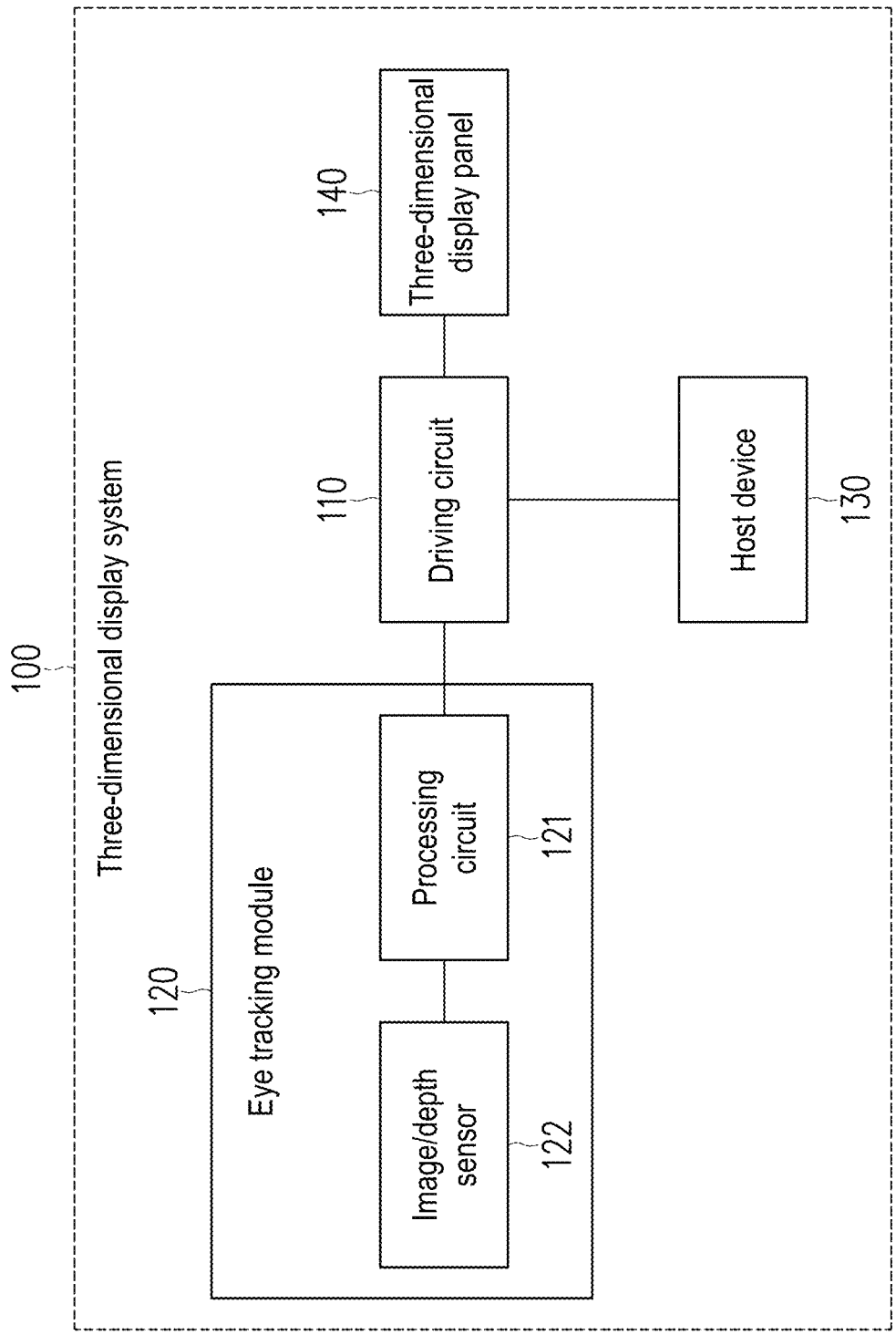
FIG. 1 is a schematic diagram of a three-dimensional display system according to an embodiment of the disclosure.

Reference will now be made in detail to the exemplary embodiments of the disclosure, examples of which are illustrated in the accompanying drawings. Whenever possible, the same reference numbers are used in the drawings and the description to refer to the same or like components.

Certain terms are used throughout the specification and appended claims of the disclosure to refer to specific components. Those skilled in the art should understand that electronic device manufacturers may refer to the same components by different names. This article does not intend to distinguish those components with the same function but different names. In the following description and rights request, the words such as "comprise" and "include" are open-ended terms, and should be explained as "including but not limited to . . . "

The term "coupling (or electrically connection)" used throughout the whole specification of the present application (including the appended claims) may refer to any direct or indirect connection means. For example, if the text describes that a first device is coupled (or connected) to a second device, it should be interpreted that the first device may be directly connected to the second device, or the first device may be indirectly connected through other devices or certain connection means to be connected to the second device.

FIG. 1 is a schematic diagram of a three-dimensional display system according to an embodiment of the disclosure. Referring to FIG. 1, the three-dimensional display system 100 includes a driving circuit 110, an eye tracking module 120, a host device 130, and a three-dimensional display panel 140. The driving circuit 110 is coupled to the eye tracking module 120, the host device 130, and the three-dimensional display panel 140. In the embodiment of the disclosure, the eye tracking module 120 is configured to detect eyes of a user to obtain corresponding eye information. In the embodiment of the disclosure, the eye tracking module 120 includes a processing circuit 121 and an image/depth sensor 122. The processing circuit 121 may be an application specific integrated circuit (ASIC). The processing circuit 121 may include a depth decoder and an eye tracking operation circuit, and may be configured to perform a depth decode operation and an eye tracking operation. The eye tracking module 120 is configured to provide the corresponding eye information to the driving circuit 110, and the host device 130 is configured to provide three-dimensional image data to the driving circuit 110.

In the embodiment of the disclosure, the driving circuit 110 is configured to adjust the three-dimensional image data according to the corresponding eye information, so as to generate an adjusted three-dimensional image data to the three-dimensional display panel 140. Thus, the three-dimensional display panel 140 may display a three-dimensional image suitable for the user currently viewing the screen.

In the embodiment of the disclosure, the three-dimensional display system 100 may include a naked-eye three-dimensional display device, and the driving circuit 110, the eye tracking module 120 and the three-dimensional display panel 140 may be integrated into the naked-eye three-dimensional display device. In the embodiment of the disclosure, the driving circuit 110 may be a display driver or a timing controller (TCON). The host device 130 may be a computer device, and may, for example, output am image streaming of the three-dimensional image to the naked-eye three-dimensional display device. The three-dimensional display panel 140 may be configured to provide naked-eye three-dimensional display function.

Figure 2:
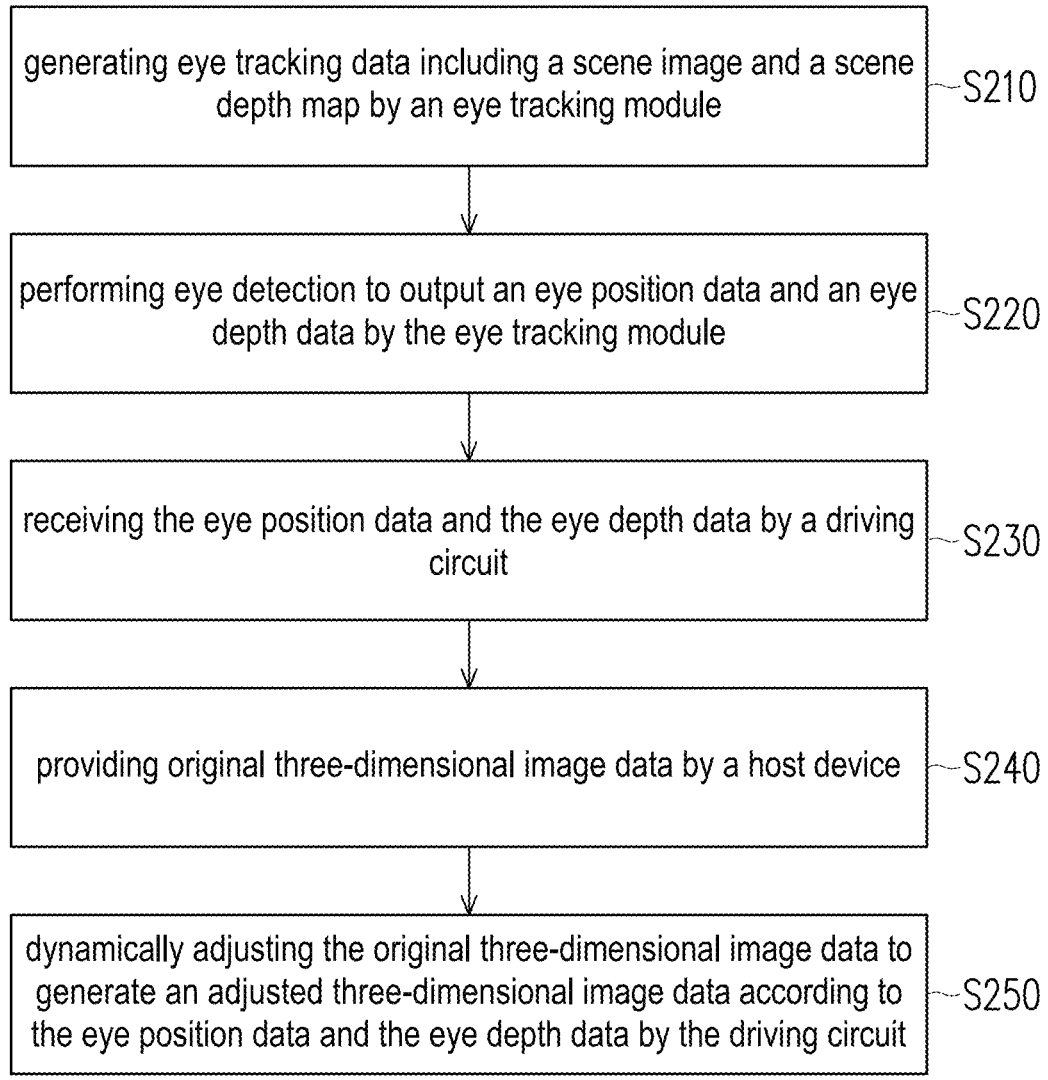
FIG. 2 is a flowchart of a display method according to an embodiment of the disclosure.

FIG. 2 is a flowchart of a display method according to an embodiment of the disclosure. Referring to FIG. 1 and FIG. 2, the three-dimensional display system 100 may execute the following steps S210 to S250. In step S210, the eye tracking module 120 may generate eye tracking data including a scene image and a scene depth map. In step S220, the eye tracking module 120 may perform eye detection to output an eye position data (i.e. two-dimensional image) and an eye depth data (i.e. depth information) to the driving circuit 110. In the embodiment of the disclosure, the eye position data may include a left eye position coordinate and a right eye position coordinate, and the eye depth data comprises a left eye depth value and a right eye depth value. In step S230, the driving circuit 110 may receive the eye position data and the eye depth data. In step S240, the host device 130 may provide original three-dimensional image data to the driving circuit 110. In the embodiment of the disclosure, the original three-dimensional image data may include right image data and left image data.

In step S250, the driving circuit 110 may dynamically adjust the original three-dimensional image data to generate an adjusted three-dimensional image data according to the eye position data and the eye depth data. Therefore, the driving circuit 110 may effectively drive the three-dimensional display panel 140 to display an adjusted three-dimensional image according to the adjusted three-dimensional image data. Thus, the three-dimensional display panel 140 may display the three-dimensional image suitable for the user currently viewing the screen. Moreover, the host device 130 does not need to receive the eye position data and the eye depth data to process the original three-dimensional image data. That is, the computing resources of the host device 130 and the latency of data transmission between the driving circuit 110 and the host device 130 may be effectively reduced.

Figure 3:
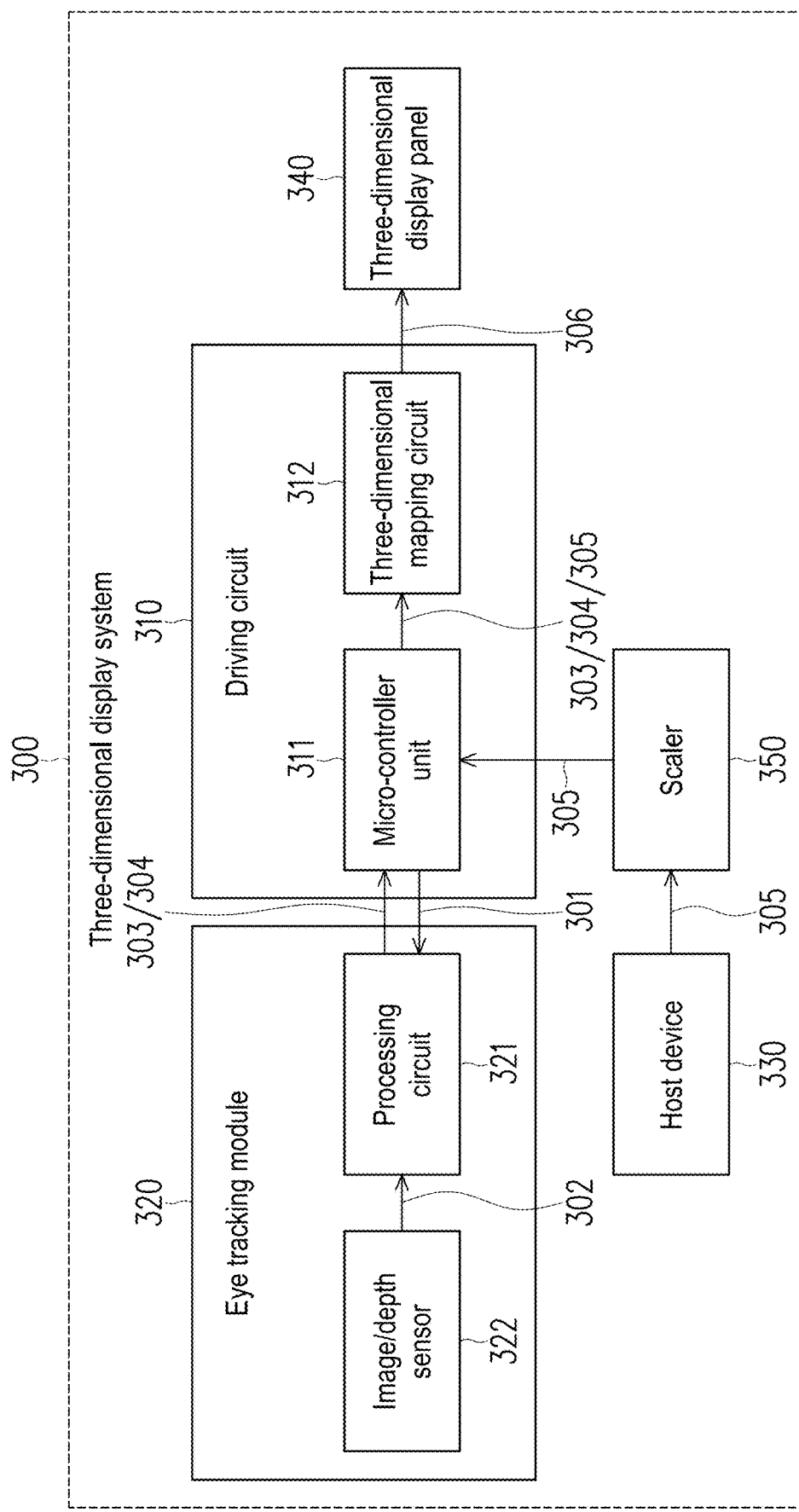
FIG. 3 is a schematic diagram of a three-dimensional display system according to an embodiment of the disclosure.

FIG. 3 is a schematic diagram of a three-dimensional display system according to an embodiment of the disclosure. Referring to FIG. 3, the three-dimensional display system 300 includes a driving circuit 310, an eye tracking module 320, a host device 330, a three-dimensional display panel 340, and a scaler 350. The driving circuit 310 is coupled to the eye tracking module 320 and the three-dimensional display panel 340, and is coupled to the host device 330 through the scaler 350. In the embodiment of the disclosure, the eye tracking module 320 is configured to detect eyes of a user to obtain corresponding eye information. In the embodiment of the disclosure, the driving circuit 310 includes a micro-controller unit (MCU) 311 and a three-dimensional mapping circuit 312. The three-dimensional mapping circuit 312 may be an application specific integrated circuit. The eye tracking module 320 includes a processing circuit 321 and an image/depth sensor 322. The micro-controller unit 311 is coupled to the processing circuit 321, the three-dimensional mapping circuit 312, and the scaler 350.

In the embodiment of the disclosure, the micro-controller unit 311 of the driving circuit 310 may output a synchronization signal 301 to the processing circuit 321 of the eye tracking module 320 through a general-purpose input/output (GPIO) pin, so that the processing circuit 321 controls the image/depth sensor 322 of the eye tracking module 320 to perform eye tracking operation to generate the eye tracking data 302. The eye tracking data 302 includes a scene image and a scene depth map. The processing circuit 321 may analyze the eye tracking data 302 to generate eye position data 303 and eye depth data 304, and the processing circuit 321 may output the eye position data 303 and the eye depth data 304 to the driving circuit 310 through an inter-integrated circuit (I2C) interface or a serial peripheral interface (SPI). In one embodiment of the disclosure, the driving circuit 310 outputs the synchronization signal 301 to the processing circuit 321 and receives the eye position data 303 and the eye depth data 304 from the processing circuit 321 through the different signal transmission interfaces.

In the embodiment of the disclosure, the host device 330 provides the original three-dimensional image data to the driving circuit 310 through the scaler 350. The host device 330 may be a person computer (PC), and may output the original three-dimensional image data 305 to the scaler 350 through a high definition multimedia interface (HDMI). The scaler 350 may change the data or signal formats of the original three-dimensional image data 305, and may output the original three-dimensional image data 305 to the micro-controller unit 311 through an embedded display port (eDP). In the embodiment of the disclosure, the micro-controller unit 311 may provide the original three-dimensional image data 305, eye position data 303 and eye depth data 304 to the three-dimensional mapping circuit 312. The three-dimensional mapping circuit 312 may be a data computing circuit, and may be configured to dynamically adjust the original three-dimensional image data 305 to generate adjusted three-dimensional image data 306 according to the eye position data 303 and the eye depth data 304. The driving circuit 310 may output the adjusted three-dimensional image data 306 to the three-dimensional display panel 340 to drive the three-dimensional display panel 340. Therefore, the three-dimensional display panel 340 may display an adjusted three-dimensional image suitable for the user currently viewing the screen according to the adjusted three-dimensional image data.

Figure 4:
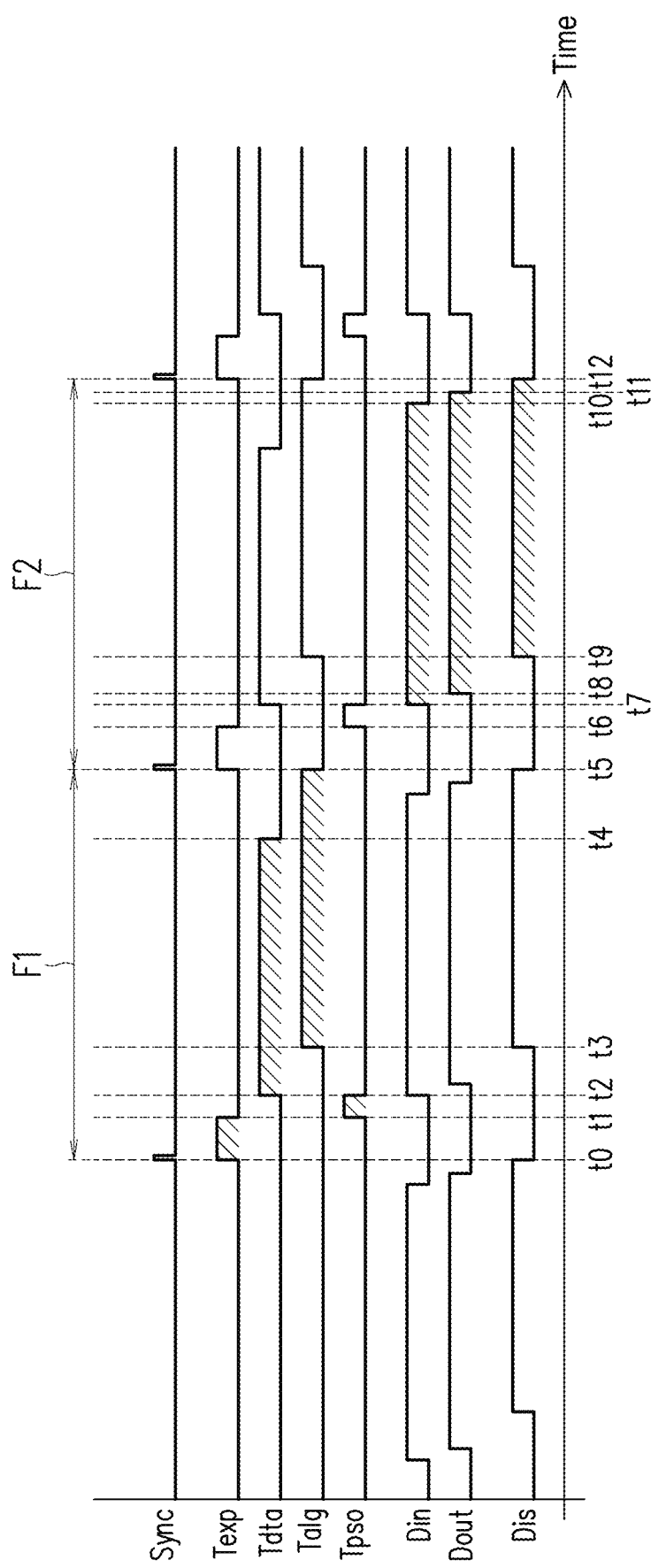
FIG. 4 is a timing diagram of a plurality of operations of the three-dimensional display system according to an embodiment of the disclosure.

Referring to FIG. 3 and FIG. 4, more specifically, the timing relationship of relevant data and signal transmission as shown as FIG. 4. In the embodiment of the disclosure, referring to timing Sync, in a period of a current frame F1 from time t0 to time t5, the micro-controller unit 311 may output the synchronization signal 301 (pulse signal) to the processing circuit 321 at times t0, t5, and t12. Thus, referring to timing Texp, during the period from time t0 to time t1, the processing circuit 321 may operate the image/depth sensor 322 to perform an exposure operation according to the synchronization signal 301. Then, referring to timing Tdta, during the period from time t2 to time t4, the image/depth sensor 322 may transmit the eye tracking data 302 including the scene image and the scene depth map to the processing circuit 321. Referring to timing Talg, during the period from time t3 to time t5, the processing circuit 321 may execute an eye tracking algorithm to generate the eye position data 303 and the eye depth data 304. Therefore, referring to timing Tpso, during a period from time t6 to time t7 in an idle period of the next frame from time t5 to time t9, the processing circuit 321 outputs the eye position data 303 and the eye depth data 304 to the micro-controller unit 311 of the driving circuit 310. In one embodiment of the disclosure, the processing circuit 321 may output the eye position data 303 and the eye depth data 304 to the micro-controller unit 311 of the driving circuit 310 during an idle period of another frame after next frame.

Referring to timing Din, during a period from time t7 to time t10, the micro-controller unit 311 of the driving circuit 310 may receive the original three-dimensional image data 305 from the scaler 350. Referring to timing Dout, during a period from time t8 to time t11, the three-dimensional mapping circuit 312 of the driving circuit 310 may adjust the original three-dimensional image data 305 to output the adjusted three-dimensional image data 306 according to the eye position data 303 and the eye depth data 304 to the three-dimensional display panel 340. Thus, referring to timing Dis, during a period from time t9 to time t12, the three-dimensional display panel 340 may display the adjusted three-dimensional image suitable for the user currently viewing the screen according to the adjusted three-dimensional image data 306.

Taking the three-dimensional display panel 340 with a refresh rate of 144 Hz as an example, the time length from the time t0 when the exposure starts to the time t9 when the first display line of the three-dimensional display panel 340 starts to display the adjusted three-dimensional image may 9.2 milliseconds (ms). The time length from the time t0 when the exposure starts to the time t12 when the first display line of the three-dimensional display panel 340 completes displaying the adjusted three-dimensional image may be 15.5 ms. Therefore, the three-dimensional display system 300 can effectively reduce the latency of data transmission between the driving circuit 310 and the host device 330.

Figure 5:
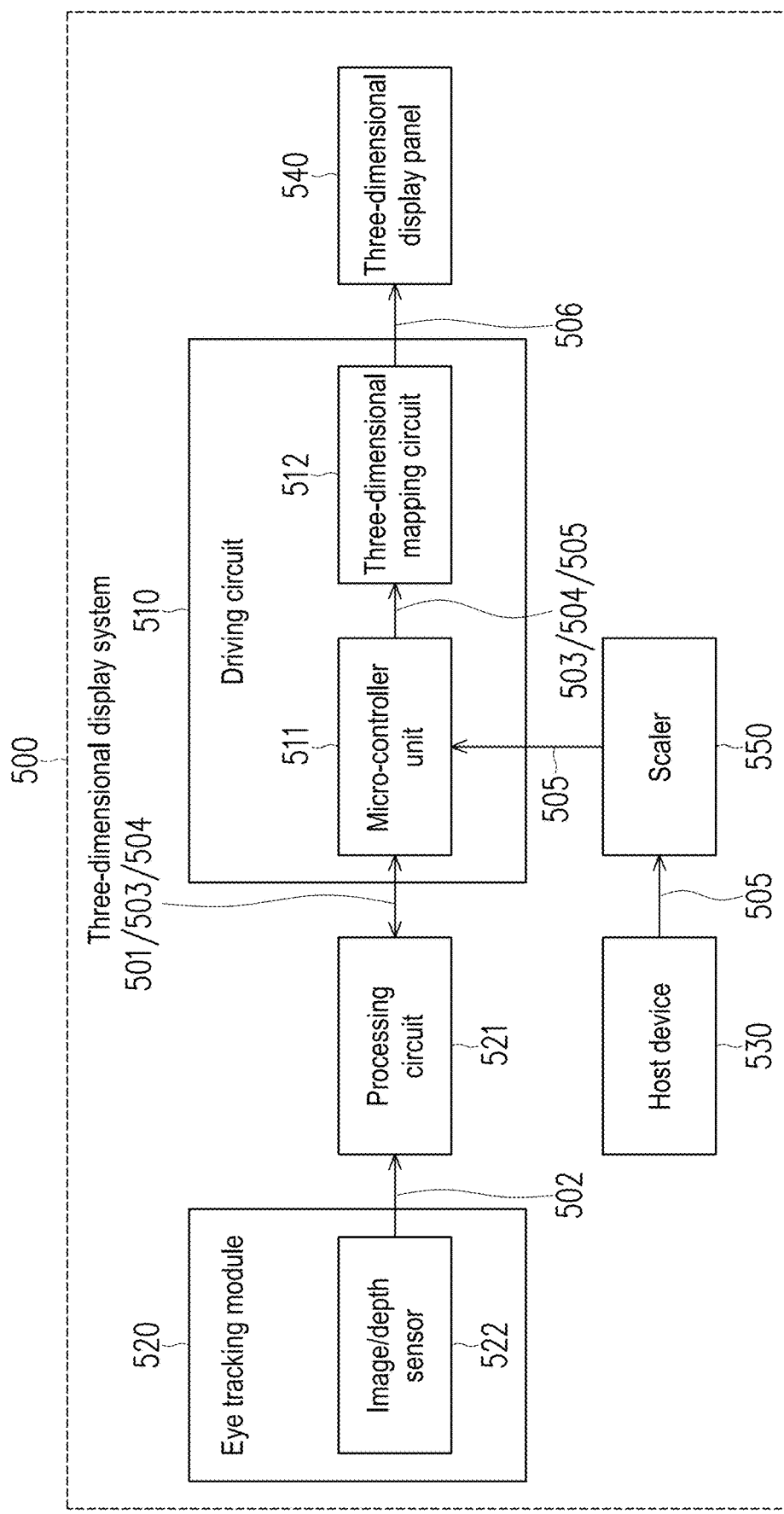
FIG. 5 is a schematic diagram of a three-dimensional display system according to an embodiment of the disclosure.

FIG. 5 is a schematic diagram of a three-dimensional display system according to an embodiment of the disclosure. Referring to FIG. 5, the three-dimensional display system 500 includes a driving circuit 510, an eye tracking module 520, a processing circuit 521, a host device 530, a three-dimensional display panel 540, and a scaler 550. The driving circuit 510 is coupled to the eye tracking module 520 and the three-dimensional display panel 540, and is coupled to the host device 530 through the scaler 550. In the embodiment of the disclosure, the processing circuit 521 is disposed out of the eye tracking module 520. The eye tracking module 520 may be implemented as an eye tracking camera, and the processing circuit 521 may be implemented as one integrated circuit disposed in another electronic device. In the embodiment of the disclosure, the driving circuit 510 includes a micro-controller unit 511 and a three-dimensional mapping circuit 512. The three-dimensional mapping circuit 512 may be an application specific integrated circuit. The eye tracking module 520 includes an image/depth sensor 522. The micro-controller unit 511 is coupled to the processing circuit 521, the three-dimensional mapping circuit 512, and the scaler 550.

In the embodiment of the disclosure, the micro-controller unit 511 of the driving circuit 510 may output a synchronization signal 501 to the processing circuit 521, so that the processing circuit 521 controls the image/depth sensor 522 of the eye tracking module 520 to perform eye tracking operation to generate the eye tracking data 502. The eye tracking data 502 includes a scene image and a scene depth map. The processing circuit 521 may analyze the eye tracking data 502 to generate eye position data 503 and eye depth data 504, and the processing circuit 521 may output the eye position data 503 and the eye depth data 504 to the driving circuit 510 through an inter-integrated circuit (I2C) interface or a serial peripheral interface (SPI). In one embodiment of the disclosure, the driving circuit 510 outputs the synchronization signal 501 to the processing circuit 521 and receives the eye position data 503 and the eye depth data 504 from the processing circuit 521 through the same signal transmission interfaces.

In the embodiment of the disclosure, the host device 530 provides the original three-dimensional image data 505 to the driving circuit 510 through the scaler 550. The host device 530 may be a person computer (PC), and may output the original three-dimensional image data 505 to the scaler 550 through a high definition multimedia interface (HDMI). The scaler 550 may change the data or signal formats of the original three-dimensional image data 505, and may output the original three-dimensional image data 505 to the micro-controller unit 511 through an embedded display port (eDP). In the embodiment of the disclosure, the micro-controller unit 511 may provide the original three-dimensional image data 505, eye position data 503 and eye depth data 504 to the three-dimensional mapping circuit 512. The three-dimensional mapping circuit 512 may be a data computing circuit, and may be configured to dynamically adjust the original three-dimensional image data 505 to generate adjusted three-dimensional image data 506 according to the eye position data 503 and the eye depth data 504. The driving circuit 510 may output the adjusted three-dimensional image data 506 to the three-dimensional display panel 540 to drive the three-dimensional display panel 540. Therefore, the three-dimensional display panel 540 may display an adjusted three-dimensional image suitable for the user currently viewing the screen according to the adjusted three-dimensional image data.

Figure 6:
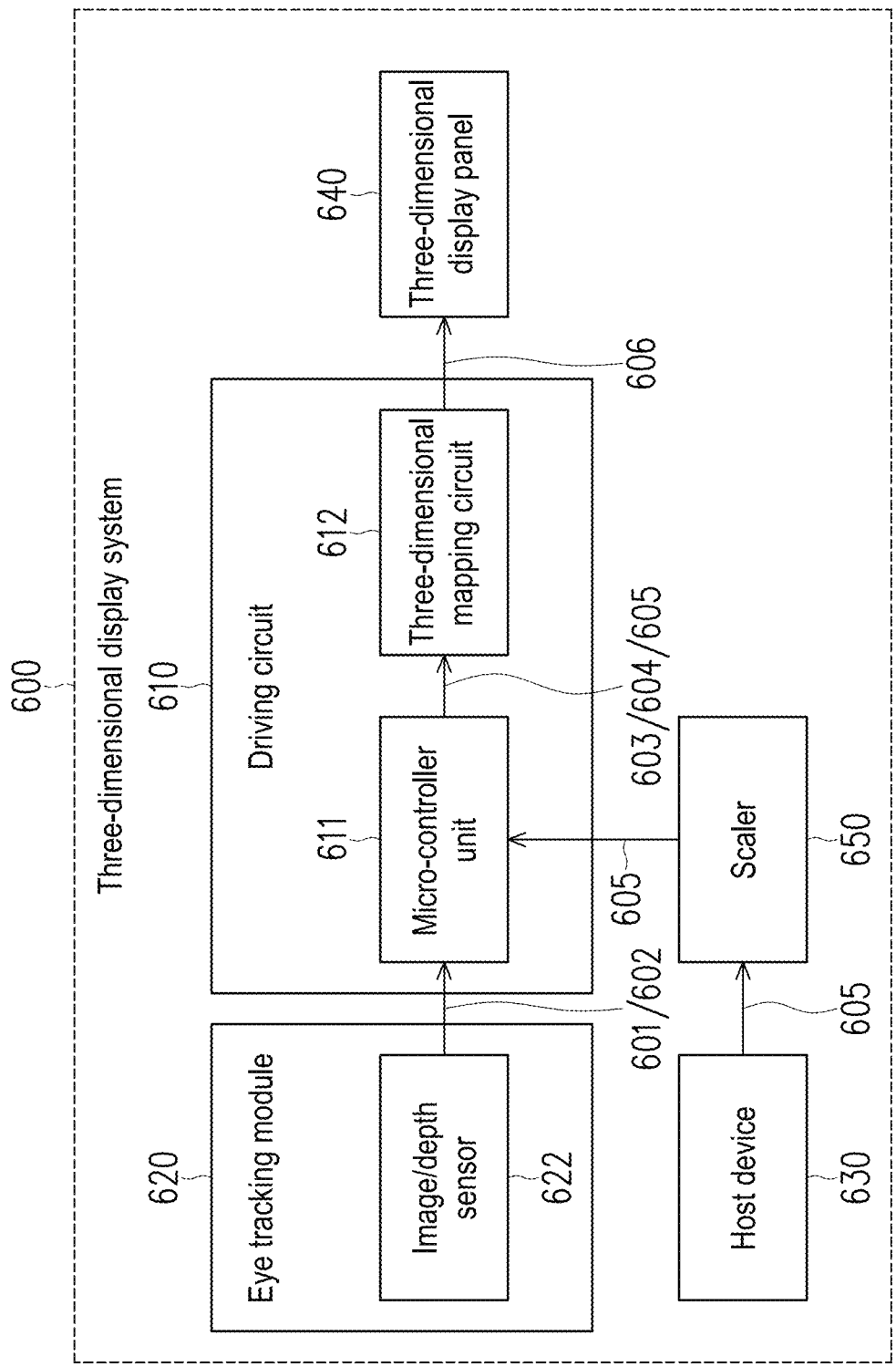
FIG. 6 is a schematic diagram of a three-dimensional display system according to an embodiment of the disclosure.

FIG. 6 is a schematic diagram of a three-dimensional display system according to an embodiment of the disclosure. Referring to FIG. 6, the three-dimensional display system 600 includes a driving circuit 610, an eye tracking module 620, a host device 630, a three-dimensional display panel 640, and a scaler 650. The driving circuit 610 is coupled to the eye tracking module 620 and the three-dimensional display panel 640, and is coupled to the host device 630 through the scaler 650. In the embodiment of the disclosure, the eye tracking module 620 may be implemented as an eye tracking camera. In the embodiment of the disclosure, the driving circuit 610 includes a micro-controller unit 611 and a three-dimensional mapping circuit 612. The three-dimensional mapping circuit 612 may be an application specific integrated circuit. The eye tracking module 620 includes an image/depth sensor 622. The micro-controller unit 611 is coupled to the image/depth sensor 622, the three-dimensional mapping circuit 612, and the scaler 650.

In the embodiment of the disclosure, the micro-controller unit 611 of the driving circuit 610 may output a synchronization signal 601 to the image/depth sensor 622, so as to control the image/depth sensor 622 of the eye tracking module 620 to perform eye tracking operation to generate the eye tracking data 602. The eye tracking data 602 includes a scene image and a scene depth map. The micro-controller unit 611 may output the synchronization signal 601 to the image/depth sensor 622 and receives the eye tracking data 602 from the image/depth sensor 622 through the same signal transmission interfaces, such as mobile industry processor interface (MIPI). The micro-controller unit 611 may analyze the eye tracking data 602 to generate eye position data 603 and eye depth data 604, or the micro-controller unit 611 may output the eye tracking data 602 to the three-dimensional mapping circuit 612, so that the three-dimensional mapping circuit 612 analyze the eye tracking data 602 to generate eye position data 603 and eye depth data 604.

In the embodiment of the disclosure, the host device 630 provides the original three-dimensional image data 605 to the driving circuit 610 through the scaler 650. The host device 630 may be a person computer (PC), and may output the original three-dimensional image data 605 to the scaler 650 through a high definition multimedia interface (HDMI). The scaler 650 may change the data or signal formats of the original three-dimensional image data 605, and may output the original three-dimensional image data 605 to the micro-controller unit 611 through an embedded display port (eDP). In the embodiment of the disclosure, the micro-controller unit 611 may provide the original three-dimensional image data 605, eye position data 603 and eye depth data 604 to the three-dimensional mapping circuit 612. The three-dimensional mapping circuit 612 may be a data computing circuit, and may be configured to dynamically adjust the original three-dimensional image data 605 to generate adjusted three-dimensional image data 606 according to the eye position data 603 and the eye depth data 604. The driving circuit 610 may output the adjusted three-dimensional image data 606 to the three-dimensional display panel 640 to drive the three-dimensional display panel 640. Therefore, the three-dimensional display panel 640 may display an adjusted three-dimensional image suitable for the user currently viewing the screen according to the adjusted three-dimensional image data.

In summary, the three-dimensional display system, the driving circuit, and the display method of the disclosure can effectively dynamically adjust a three-dimensional image based on the eye position of the user, so that the three-dimensional display panel may display the three-dimensional image suitable for the user currently viewing the screen. Furthermore, the host device of the three-dimensional display system does not need to receive the eye position data and the eye depth data to process the original three-dimensional image data. Accordingly, the computing resources of the host device and the latency of data transmission between the driving circuit and the host device may be effectively reduced.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A three-dimensional display system, comprising:
an eye tracking module, configured to generate eye tracking data including a scene image and a scene depth map, and perform eye detection to output an eye position data and an eye depth data;
a driving circuit, coupled to the eye tracking module, and configured to receive the eye position data and the eye depth data; and
a host device, coupled to the driving circuit, and configured to provide original three-dimensional image data;
wherein the driving circuit is further configured to dynamically adjust the original three-dimensional image data to generate an adjusted three-dimensional image data according to the eye position data and the eye depth data.

2. The three-dimensional display system according to the claim 1, the driving circuit is further configured to output a synchronization signal to a processing circuit of the eye tracking module, so that the processing circuit controls an image/depth sensor of the eye tracking module to perform eye tracking operation to generate the eye tracking data.

3. The three-dimensional display system according to the claim 2, wherein the driving circuit outputs the synchronization signal during an idle period of a current frame of the original three-dimensional image data.

4. The three-dimensional display system according to the claim 3, wherein the processing circuit controls the image/depth sensor to perform an exposure operation to generate the eye tracking data during the idle period of the current frame of the original three-dimensional image data.

5. The three-dimensional display system according to the claim 3, wherein the processing circuit outputs the eye position data and the eye depth data to the driving circuit during an idle period of a next frame.

6. The three-dimensional display system according to the claim 3, wherein the processing circuit outputs the eye position data and the eye depth data to the driving circuit during an idle period of another frame after next frame.

7. The three-dimensional display system according to the claim 2, wherein the processing circuit is disposed out of the eye tracking module.

8. The three-dimensional display system according to the claim 2, wherein the driving circuit outputs the synchronization signal to the processing circuit and receives the eye position data and the eye depth data from the processing circuit through the same signal transmission interface.

9. The three-dimensional display system according to the claim 2, wherein the driving circuit outputs the synchronization signal to the processing circuit and receives the eye position data and the eye depth data from the processing circuit through the different signal transmission interfaces.

10. The three-dimensional display system according to the claim 1, wherein the eye position data comprises a left eye position coordinate and a right eye position coordinate.

11. The three-dimensional display system according to the claim 1, wherein the eye depth data comprises a left eye depth value and a right eye depth value.

12. The three-dimensional display system according to the claim 1, wherein the driving circuit is a timing controller.

13. The three-dimensional display system according to the claim 1, further comprising:
a three-dimensional display panel, coupled to the driving circuit,
wherein the driving circuit is further configured to drive the three-dimensional display panel to display an adjusted three-dimensional image according to the adjusted three-dimensional image data.

14. The three-dimensional display system according to the claim 1, further comprising:
a scaler, coupled between the driving circuit and the host device, wherein the host device is configured to provide the original three-dimensional image data to the driving circuit through the scaler.

15. A driving circuit for driving a three-dimensional display panel, comprising:
a micro-controller unit, configured to receive original three-dimensional image data, eye position data and eye depth data, and
a three-dimensional mapping circuit, coupled to the micro-controller unit, and configured to dynamically adjust original three-dimensional image data to generate adjusted three-dimensional image data according to the eye position data and the eye depth data,
wherein the three-dimensional display panel is further configured to display an adjusted three-dimensional image according to the adjusted three-dimensional image data.

16. The driving circuit according to the claim 15, the micro-controller unit is further configured to output a synchronization signal to a processing circuit of the eye tracking module, so that the processing circuit controls an image/depth sensor of the eye tracking module to perform eye tracking operation.

17. The driving circuit according to the claim 16, wherein the micro-controller unit outputs the synchronization signal during an idle period of a current frame of the original three-dimensional image data.

18. The driving circuit according to the claim 16, wherein the micro-controller unit outputs the synchronization signal to the processing circuit and receives the eye position data and the eye depth data from the processing circuit through the same signal transmission interface.

19. The driving circuit according to the claim 16, wherein the micro-controller unit outputs the synchronization signal to the processing circuit and receives the eye position data and the eye depth data from the processing circuit through the different signal transmission interfaces.

20. A display method, comprising:
generating eye tracking data including a scene image and a scene depth map by an eye tracking module;
performing eye detection to output an eye position data and an eye depth data by the eye tracking module;
receiving the eye position data and the eye depth data by a driving circuit;
providing original three-dimensional image data by a host device; and
dynamically adjusting the original three-dimensional image data to generate an adjusted three-dimensional image data according to the eye position data and the eye depth data by the driving circuit.

* * * * *